Figure 1:
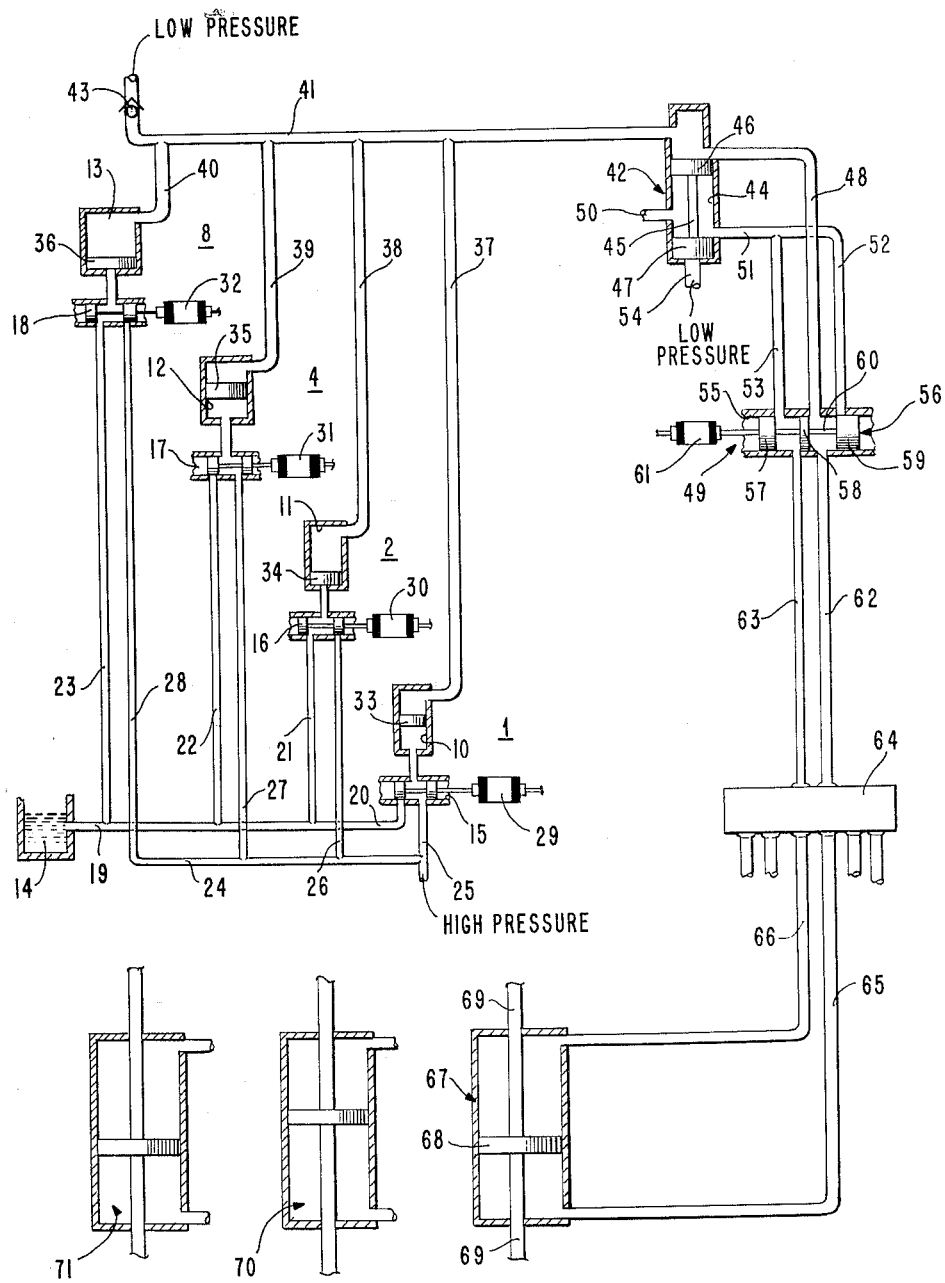

INVENTOR
JERRY W. RAIDER
BY *George J. Netter*
ATTORNEY

May 21, 1963   J. W. RAIDER   3,090,552
CONTROL SYSTEM

Filed July 3, 1961   3 Sheets-Sheet 2

ADD

SUBTRACT

LOCK

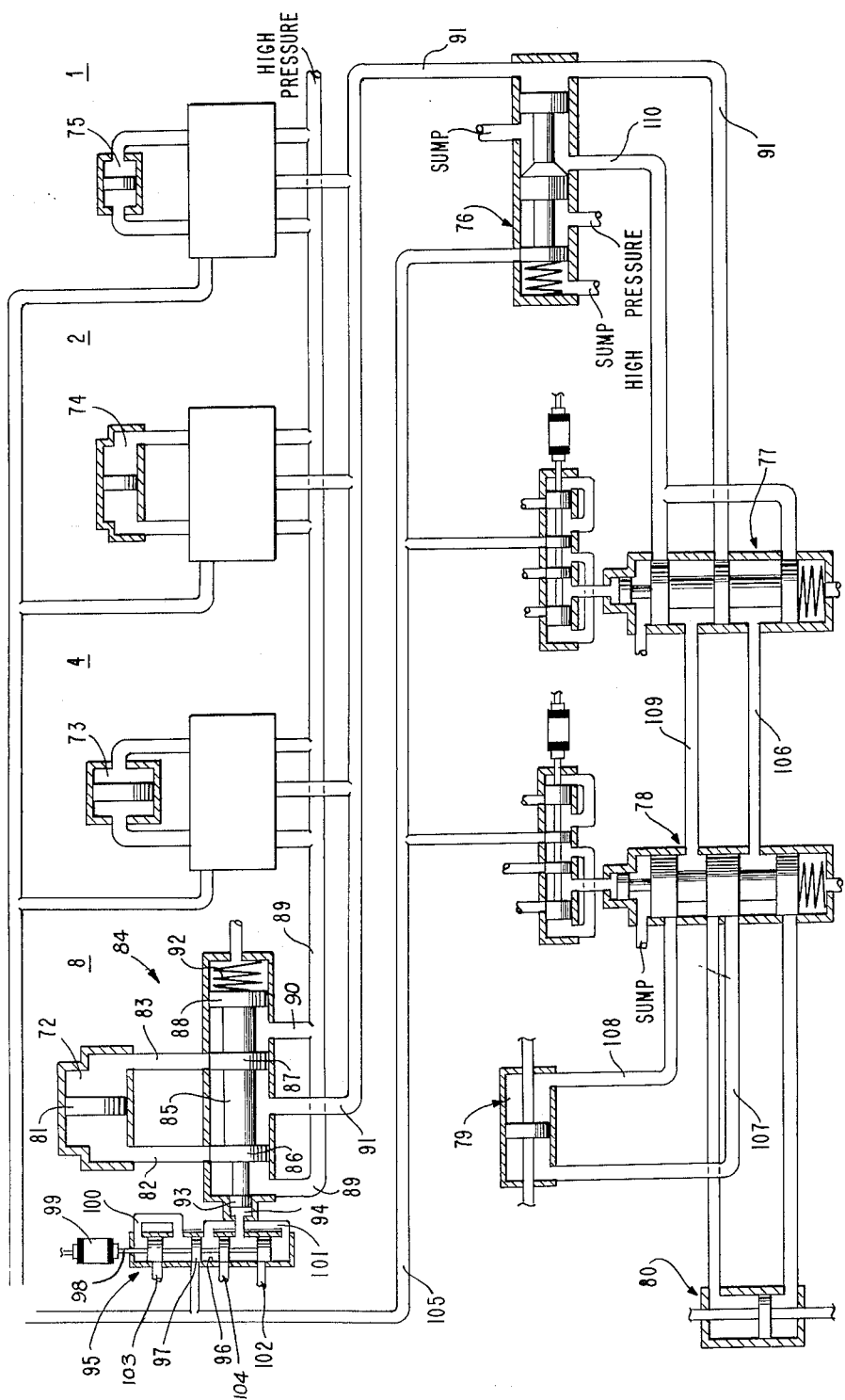

United States Patent Office 3,090,552
Patented May 21, 1963

3,090,552
CONTROL SYSTEM
Jerry W. Raider, Endicott, N.Y., assignor to International Business Machines Corporation, New York, N.Y., a corporation of New York
Filed July 3, 1961, Ser. No. 121,415
7 Claims. (Cl. 235—61)

The present invention relates to a control system, and in particular to such a system for the direct conversion of an electric digital signal to an analog output.

In a variety of different applications, an important requisite function is the conversion of electric signals representative of a functional relationship, and frequently in coded binary digital form, to a usable mechanical force or movement. For example, in missile and aircraft control apparatus, the extremely high average velocities have given rise to the need for correspondingly high accuracy and speed in computing of course information, and deviations therefrom, and conversion of this information into analog form for resetting or reorienting the craft.

Recently, advancements in this area have been toward the direct utilization of digital electric signals by fluid operational translating equipment that provides substantially immediate actuating pressures or movements in response to the signals. This type of approach is sometimes referred to by the term "digital hydraulics" and comprises in its broader aspects the activation through appropriate interconnecting logic circuitry of hydraulic valve means to provide predetermined amounts of fluid, the particular amounts having a coded relation to the input signals, and the utilization of the transferred fluid to provide a controlled motion.

In devices of this general type, it is important to provide a smooth response and precise output positioning as well as overall high speed of operation.

It is therefore a primary object of the invention to provide a system for translating digital information to an analog form in a smooth and expeditious manner.

Another object of the invention is to provide such a system not requiring resetting operations.

A further object of the invention is the provision of such a system in which fluid damping smooths changes of state.

Another object is the provision of a system of the above character having the capability for producing successive outputs of either addition or subtraction character and having substantially complete time continuity.

Briefly, the invention comprises a plurality of precalibrated cylinders and associated piston(s) actuable in parallel to feed measured amounts of fluid into feed lines. The feed lines provide communication for the fluid via a sign determination means to a two-way output cylinder for positioning an output piston and shaft correspondingly. A special fluid locking means is incorporated in the fluid feed to the output cylinder for smoothing positioning of the load.

Another aspect is the provision of two-way pistons for the precalibrated cylinders and coordinated valve means for supplying fluid to these pistons such that consecutive counting impulses cause the pistons to be moved in opposite directions.

The foregoing and other objects, features and advantages of the invention will be apparent from the following more particular description of a preferred embodiment of the invention, as illustrated in the accompanying drawings.

Figure 2A:
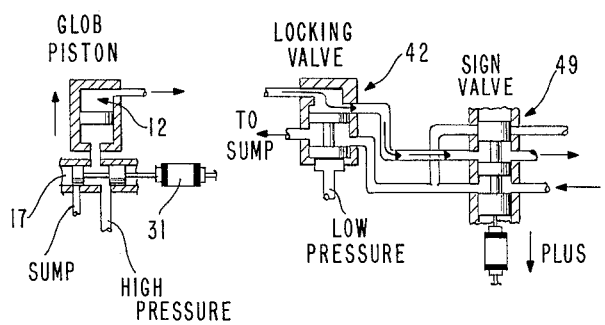
Figure 2A:
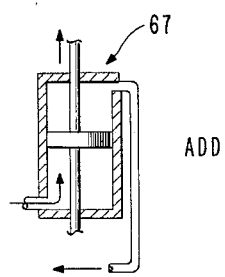
Figure 2B:
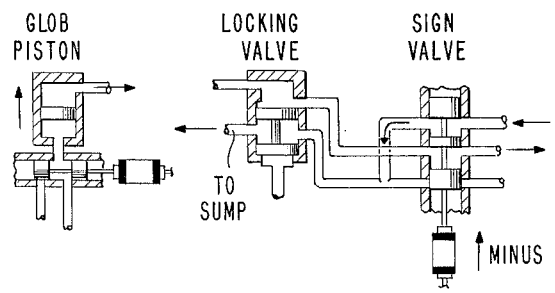
Figure 2B:
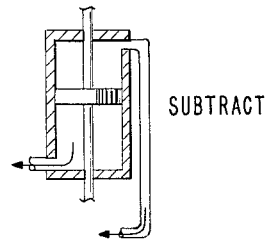
Figure 2C:
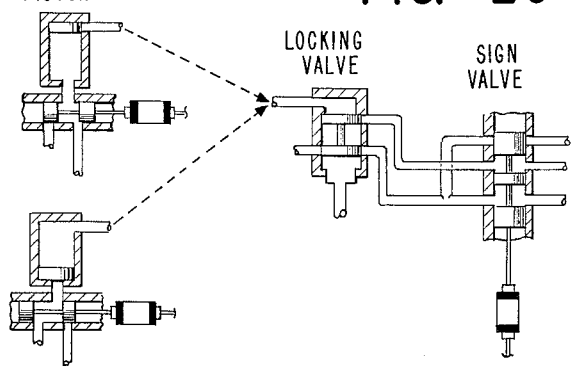
Figure 2C:
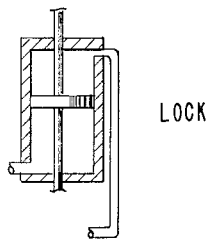

In the drawings:

FIG. 1 is a diagrammatic representation of a system for practicing the invention;

FIGS. 2a, b and c illustrates the step-by-step operation of the embodiment of FIG. 1; and FIG. 3 is an alternate manner of practicing the invention.

With reference now particularly to FIG. 1, there is illustrated in diagrammatic form an exemplary form of the invention particularly pointing out a novel means for smoothing sharp inertial changes of the movable parts of the system. In its main features, the system is comprised of four glob cylinders 10–13 having individual capacities binarily related to one another. Thus, cylinder 10 has a capacity equivalent to one unit; cylinder 11, two units; cylinder 12, four units; and cylinder 13, eight units. This is indicated generally in the drawing by the numerals 1, 2, 4 and 8, respectively. Communication to each of the glob cylinders is provided from a sump or reservoir 14 through control valves 15–18 via main line 19 and individual lines 20–23. In addition, high pressure fluid is provided to the same valves from a suitable source (not shown) through line 24 and separate branch lines 25–28.

The valves 15–18 have spools with two lands each which can be positioned by solenoids 29–32 to connect either high pressure fluid or the sump to the appropriate cylinders. For example, solenoid 29 is shown in an energized state with the sump closed off, or disconnected, from the cylinder 10, and the high pressure fluid is in open communication with the same cylinder. In the de-energized state (glob cylinders 16, 13), the spools are shifted toward the left, as shown, closing off the high pressure lines to the corresponding cylinders and simultaneously interconnecting the sump to the same cylinders.

Each glob cylinder has an associated glob piston 33–36, respectively. Output conduits 37–40 are provided, one for each of the cylinders 10–13, and which are fed into a main line 41. The main feed line 41 is in direct communication with one end of a locking valve 42, and also has access to low pressure fluid, i.e., less than the high pressure fluid but greater than sump pressure, through a check valve 43.

The locking valve is comprised of a cylinder 44, the upper end of which has a reduced cross-sectional dimension, and a spool 45 having two lands 46, 47 received in close fitting relation within the larger cylinder cavity. As noted, the feed line 41 is introduced into the smaller cavity of the cylinder 44. A first locking valve output line 48 is fed out of the larger cavity of the cylinder from a point adjacent the smaller cavity thereof and is operatively connected to a sign actuating means 49. Pipe means 50 provides continuous interconnection to those portions of the cylinder 44 lying between the lands of the spool 45 with the sump. A second locking valve output line 51 is formed into two branch lines 52, 53 which are introduced into the sign actuating means. Low pressure fluid is supplied via line 54 to the extremity of cylinder 44 for acting on the spool 45.

The locking valve 42 is seen to have two operative positions. When the spool 45 is in its lowermost position, as shown in FIG. 1, fluid from the main feed line 41 can be transferred directly to the first locking valve output line 48 through the smaller cavity of the cylinder 44, and the sump is, at the same time, in communication with the second locking valve output line 51 via that portion of the cylinder lying between the lands 46, 47. On the other hand when the spool is moved to its uppermost position (with the face of land 46 abutting against the lower reaches of the smaller cavity), both the first and second locking valve output lines are blocked off by the lands 46 and 47, respectively. The purpose and full interrelated functioning of the locking valve with the remainder of the apparatus is set forth below.

The sign actuating means 49 is comprised of a cylinder 55 having the three already noted input lines 48, 52 and 53. The sign spool 56 has three lands 57–59 disposed in a fixed spaced relation on a common rod 60. Control of the piston placement is provided by a solenoid 61 operatively engaged with the rod 60 to situate the lands in either of two functioning positions. Thus, actuation of the solenoid to add moves the spool to the left, i.e., as shown in the figure, providing a direct path for actuation fluid introduced by line 48 to add line 62 while simultaneously providing a path from sump line 53 through the cylinder to subtract line 63. When the solenoid is actuated to subtract, the spool 56 moves to the right causing land 57 to close off branch line 53 and land 58 to close off add line 62 leaving the first locking valve output line 48 in open communication with the subtract line 63.

The add and subtract lines 62 and 63 are tied into a multiplexing valve 64, which, for present purposes, can be considered as including a pair of fluid confining chambers, one for the subtract line 63 and one for the add line 62, each having a plurality of feed lines leading therefrom for the multiple transmission of quantities of fluid identical with input quantities.

Add and subtract lines 65 and 66 lead from the multiplexing valve 64 to the lower and upper ends, respectively, of an accumulator cylinder 67 having an accumulator piston 68. Thus, it is assumed here that a measured movement of the piston 67 in an upward direction is an "addition" or "positive" change, whereas a downward movement of the same piston is a "subtraction" or "negative" change. A motion transferring shaft 69 is fixedly attached to the piston 68 for external application of movements of the accumulator piston to peripheral equipment, the repositioning of which it is desired to effect.

For illustrative purposes, two other accumulator cylinders 70 and 71, with associated pistons and motion transferring shafts, are shown and interconnections with the multiplexing valve would be identical to those described for cylinder 67.

As to the timing relationship and control of the sign solenoid 61, and the solenoids 29–32, it is assumed additional collateral equipment is provided for this function, and, in particular, the equipment for this purpose here is considered to be an electronic digital computer providing electric output signals of a binarily coded nature. However, it is clear that the practice of the invention is in nowise restricted to this arrangement alone, and the choice of illustrative collateral equipment is merely to indicate the generally high level of performance required of the system described herein particularly with respect to speed and fidelity of response.

In operation, it is assumed that the collateral equipment has presented a parallel electric output in binary form of 101 which means the system is to add five (5) units of fluid to the output or accumulator cylinder 67. Accordingly, the sign actuating means 49 is positioned to its leftmost position by energization of the solenoid 61 and similarly, solenoids 30 and 32 are energized moving the associated spools of the control valves 15 and 17 to their rightmost position.

It is to be noted that FIG. 1 is drawn showing pistons 33 and 35 in approximately mid-add position, whereas on initial energization of the solenoids, the pistons are in the lowermost position as are pistons 34 and 36.

High pressure lines 25 and 27 provide high pressure fluid through the valves 15 and 17 into the lower portion of the cylinders 10 and 12 exerting a pressure on the lower surface of the pistons 33 and 35 contained therein. This force causes the pistons to rise against lower pressure fluid directly above the pistons and thus to move fluid outwardly into the feed line 41 and thence into the upper end of the locking valve 42, out and along the feed line 48, through the sign cylinder, along the add feed line 62 and into the lower portion of the accumulator cylinder via line 65. Since, at this time, the upper region of the accumulator cylinder 67 is in direct contact with the sump, the accumulator piston will begin to rise and will experience an increase in volume at its lower end which equals the total change in volume provided by moving the glob pistons 33 and 35 from their lower to their upper positions, i.e., provide an increase in volume of five (5) units.

With the full count of fluid added to the accumulator cylinder 67, there is a lessening of the fluid pressure in the smaller cavity of the locking valve 42. Consequently, the low pressure fluid acting on the land 47 moves the spool 45 upwardly into position to shut off both the first and second locking valve output lines 48 and 51, which locked condition remains until another glob cylinder is activated to add or subtract some quantity of fluid.

It is the main purpose of this locking action to smooth stopping action of the load being positioned by the shaft 69. This is important, since, if the load is relatively large, it might have a tendency, on an add operation for example, to continue moving in the upward direction enough to allow additional fluid via valve 43 to be introduced into the system resulting in an error. However, by locking the system from the locking valve 42 onward to the accumulator cylinder 67, errors from this source are eliminated and fluid damping of the load movement reduces any override, oscillation and the like.

After a full count has been made, the solenoids 29 and 31 are de-energized allowing the pistons of the control valves 15 and 17 to be returned to their leftmost position closing off the high pressure lines and communicating the sump lines to the lower ends of the glob pistons. With the locking valve 42 also closed at this time, low pressure fluid is able to move through the valve 43 into feed line 41 and conduits 37 and 39 to force the glob piston(s) downwardly until they are in their lowermost position. The system is now in a ready condition and can be signalled to add or subtract some new value.

FIG. 3 represents an alternate embodiment of the invention which has an additional merit of eliminating reset cycles. It comprises the same major elements as the embodiment of FIGS. 1 and 2. Thus, there are shown four (4) glob cylinders 72–75 having measured capacities of 8, 4, 2 and 1, respectively, a locking valve 76, a sign valve 77, a multiplexing means 78 and accumulator cylinders 79 and 80. However, the primary difference of this system over the previously described one lies in detailed structure and operation of the glob cylinders and special associated control means which will be set forth below.

The glob cylinder 72 includes a piston 81 which is free to move from one extremity to the other (and back) of the enclosed chamber of the cylinder (illustrated, however, at the midoint of travel for ease of presentation). The glob cylinder is provided with fluid conduit means 82 and 83 connected to the extremities thereof for communicating with a control valve 84. Within the control valve cylinder is a spool 85 having three lands 86, 87 and 88 arranged in fixed spaced relation to one another. Two lines 89 and 90 provide high pressure fluid from a suitable source of supply (not shown) to the valve 84 and a common feed line 91 communicates from the cylinder to the lower end of the locking valve 76.

One extremity of the spool is engaged with a coil spring 92 contained within the chamber and anchored to the inside end wall which serves to resiliently urge the spool toward the left as shown in the drawing. Accordingly, when the system is in a passive or inert state, i.e., the piston is at its leftmost, a control land 93 of smaller dimensions than the lands 86–88 is moved into blocking position over a similarly shaped inlet cylinder 94 in the other end wall of the chamber. Also, when in this position, the high pressure line 90 is provided a path for entrance into the conduit means 83. On the other hand when the spool 85 is in its rightmost position with the spring 92 in full compression, the land 87 blocks high pressure feed line 90, but high pressure line 89 is in full communication with conduit 82 and simultaneously conduit 83 is connected to feed line 91.

A special means 95 is provided for controlling the position of the piston 85. It comprises a cylindrical chamber 96 for containing a four land spool 97 and a piston rod 98 extending slightly through one end wall of the chamber 96 where it is operatively connected to a solenoid 99. A first fluid bypass loop 100 is provided adjacent the solenoid end of the chamber 96 for circulating fluid pressure that exists in the extremity to those portions of the cylinder a short distance inwardly thereof. A second bypass line 101 similarly connects the other extremity of the chamber to a point inwardly therefrom. A high pressure connection 102 is connected to the chamber at a point adjacent the end opposite the solenoid. Two sump connections 103 and 104 are also provided to the chamber. A common interconnection line 105 is provided between all of the control valves for each of the glob cylinders, multiplexing valve and the sign valve in addition to the chamber of the locking valve for a purpose which will be more apparent from the operation description below.

It is the purpose of the control means 95, as well as its counterpart for each of the other glob cylinders, the sign valve and the multiplexing valve, to control the fluid pressure introduced into the inlet cylinder 94, thereby controlling the movement of the land 93 and thus the position of the piston 85.

For ease in understanding both the static and dynamic operational characteristics of this embodiment, all valves and pistons are shown disposed mediate their positional limits.

In the following description of operation, it is assumed that a full capacity 15 count was commanded by the collateral equipment, however, only details of the addition of 8 globs of fluid will be gone into.

Solenoid 99 is energized to position the spool 97 downwardly to its lower extremity which provides high pressure fluid from the line 102 through the inlet cylinder 94 to move the piston 85 to its rightmost position which opens the conduit 82 to the high pressure line 89 and simultaneously connects conduit 83 to feed line 91. The high pressure moves the glob piston 81 from its leftmost to its rightmost limit of travel. Liquid is transferred along the feed line 91 past the locking valve which is now in its leftmost position. The measured volume of fluid now moves further along line 91 and into the sign valve 77, which is positioned in its uppermost condition, permitting the fluid to pass through and into add line 106. Also, with the multiplexing valve solenoid not energized, its piston is in the up position allowing the fluid to be transferred through add line 107 to the lower part of the accumulator cylinder 79 for moving it a measured distance corresponding to the eight (8) units of fluid (in addition to the amounts contributed by the other glob cylinders) which are transferred to it. The other end of the cylinder is connected to sump at this time through subtract line 108, line 109, and line 110.

With the additions made to the accumulator cylinder, there is a lower pressure existing in the line 91 which allows the locking valve piston to close off line 110 which prevents any back movement by the accumulator piston. Thus, a fluid block exists at this time through line 110, sign valve, subtract line 109, multiplexing valve and line 108 to restrain any shifting of the accumulator piston.

As long as no changes and commands are given to the system, the locking valve will stay in place and no transfers of any kind will take place. However, if the solenoid 99 is actuated again, the spool 97 shifts upwardly to the position shown in FIG. 3 which removes high pressure fluid from the inlet cylinder 94 permitting the spring 92 to move the piston 85 to its leftmost position which causes the land 86 to block off high pressure line 89, and simultaneously connect high pressure line 90 to conduit 83 effecting a transfer of the glob piston 81 to the left emptying eight (8) units of fluid via conduit 83 into the feed line 91 where it is emptied into the appropriate accumulator cylinder as before. It is this ability to count or to add bits of fluid, whether the glob piston is at one extremity or the other of its associated cylinder, that accomplishes the advantageous elimination of resetting cycles.

The manner of obtaining subtract output movements, and utilization of the multiplexing valve to actuate other accumulator cylinders, is believed to readily be obvious from the drawing, particularly in view of the detailed discussion of similar operations in the discussion of the first embodiment.

In accordance with the embodiment described immediately above, the provision of an extremely fast and accurate output motion unseparated by reset operations is made possible. This results in considerable time saving particularly in control operations of the type we are concerned with here where a great number of corrections or error changes are instituted per unit of operational time and which changes must be provided quickly, accurately and with high fidelity of response.

While the invention has been particularly shown and described with reference to preferred embodiments thereof, it will be understood by those skilled in the art that the foregoing and other changes in form and details may be made therein without departing from the spirit or scope of the invention.

What is claimed is:

1. Fluid operated positioning apparatus responsive to timed electrical signals, comprising: a cylinder of precalibrated capacity for containing fluid, having an entrance and an exit; a feed piston disposed within said cylinder, drive means responsive to certain of said signals operatively related to said feed piston for driving the same to move the fluid contained therein out said exit; an accumulating cylinder and a driver piston having a shaft for connection to a load; fluid conducting means interconnecting the exit of said precalibrated cylinder and said accumulating cylinder; and valve means operatively related with said fluid conducting means and responsive to the pressure of said fluid for blocking the flow of said fluid at the end of transference of a precalibrated amount thereof.

2. Apparatus as in claim 1, further including sign means responsive to certain other signals intermediate said accumulating cylinder and said valve means and operatively related to said fluid conducting means for selectively directing the precalibrated amounts of fluid from said precalibrated cylinder against a first side of said driver piston to add and against a second side of said piston to subtract.

3. Apparatus as in claim 1, wherein means are provided in advance of the exit of said precalibrated cylinder for driving said feed piston in alternate directions on successive fluid transferences.

4. Apparatus as in claim 1, further including multiplexing valve means in advance of said accumulator cylinder for providing a plurality of separate fluid volumes identical with the measured quantities provided from said precalibrated cylinder whereby other accumulator cylinders can be actuated by the transference of fluid from said precalibrated cylinder.

5. Apparatus for converting a binarily coded parallel set of electric signals into a corresponding positional change, comprising: means responsive to said signals for providing a decimal equivalent of said binary signals in bits of fluid; conduit means connected to said signal responsive means for transferring said bits therefrom; means in serial relation to said conduit means for receiving said fluid bits and for blocking further fluid movement in said conduit means at the completion of said transference; and an accumulation piston and cylinder adapted to receive the measured fluid from said blocking means for moving the piston an amount corresponding to the quantity of fluid bits transferred thereto.

6. A cyclic fluid control system responsive to parallel electric signals, comprising: a plurality of separate cylinders of different measured capacities related to one another as $2^n$ having fluid entrance and exit points; pistons adapted for movement within said cylinders to transfer said fluid therethrough; means operatively engaged with said cylinders and responsive to said parallel electric signals for selectively moving the appropriate pistons an amount sufficient to empty the associated cylinders; conduit means communicating with the exit points of said cylinders for receiving the measured fluid; at least one accumulation cylinder and piston means fed by said conduit means for positioning the said piston a measured linear amount corresponding to the quantity of fluid transferred to the accumulating cylinder; and means in serial relation with said conduit means for restricting fluid flow in the conduit line at the end of each accumulation operation.

7. A system as in claim 6, wherein said restricting means comprises a cylinder means the interior of which is in open communication with the conduit, a piston means received within said cylinder, low pressure fluid in pressure exerting relation to said piston means for forcing the same along a path within the said cylinder to block the flow of fluid through the conduit at the extremity of said path, said low pressure fluid being of less pressure than that provided by the movement of a single unit of fluid throughout the conduit.

References Cited in the file of this patent

UNITED STATES PATENTS 2,923,131 Furman _____ Feb. 2, 1960